(12) United States Patent
Shea et al.

(10) Patent No.: US 6,945,047 B2
(45) Date of Patent: Sep. 20, 2005

(54) APPARATUS AND METHOD FOR AUTOMATIC DETECTION AND AVOIDANCE OF TURBOCHARGER SURGE ON LOCOMOTIVE DIESEL ENGINES

(75) Inventors: Dennis Brian Shea, Slippery Rock, AR (US); Eric Richard Dillen, Edinboro, PA (US); Vincent F. Dunsworth, Edinboro, PA (US); Shawn Michael Gallagher, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/689,806

(22) Filed: Oct. 21, 2003

(65) Prior Publication Data

US 2004/0216457 A1 Nov. 4, 2004

Related U.S. Application Data

(60) Provisional application No. 60/419,895, filed on Oct. 21, 2002.

(51) Int. Cl.[7] .............................................. F02D 23/00
(52) U.S. Cl. .......................................... 60/602; 60/603
(58) Field of Search ........................... 60/600–603, 612, 60/39.281

(56) References Cited

U.S. PATENT DOCUMENTS

| | | | |
|---|---|---|---|
| 3,557,549 A | 1/1971 | Webster | |
| 3,988,894 A | 11/1976 | Melchior | 60/606 |
| 4,012,942 A | * 3/1977 | Harned | 73/35.03 |
| 4,287,717 A | 9/1981 | Oldfield et al. | 60/606 |
| 4,309,871 A | * 1/1982 | Venema | 60/39.281 |
| 4,490,622 A | 12/1984 | Osborn | |
| 4,505,117 A | * 3/1985 | Matsuoka | 60/609 |
| 5,207,063 A | 5/1993 | Blake | |
| 5,307,632 A | 5/1994 | Gottemoller et al. | 60/608 |
| 5,526,645 A | 6/1996 | Kaiser | |
| 5,605,044 A | 2/1997 | Zimmer et al. | |
| 5,704,340 A | 1/1998 | Togai | |
| 5,724,813 A | 3/1998 | Fenelon et al. | |
| 5,782,092 A | 7/1998 | Schultalbers et al. | |
| 5,816,047 A | 10/1998 | Zurlo | |
| 5,929,610 A | * 7/1999 | Friedlander et al. | 322/37 |
| 5,950,432 A | 9/1999 | Zimmer et al. | |
| 6,079,211 A | 6/2000 | Woollenweber et al. | 60/602 |
| 6,105,555 A | 8/2000 | Weber et al. | |
| 6,112,523 A | 9/2000 | Kamo et al. | |
| 6,134,888 A | 10/2000 | Zimmer et al. | |
| 6,161,384 A | 12/2000 | Reinbold et al. | |
| 6,196,189 B1 | 3/2001 | Baldwin et al. | |
| 6,243,628 B1 | 6/2001 | Bliley et al. | |
| 6,256,993 B1 | 7/2001 | Halimi et al. | |
| 6,289,873 B1 | 9/2001 | Dunsworth | |
| 6,295,816 B1 | 10/2001 | Gallagher et al. | |
| 6,298,718 B1 | 10/2001 | Wang | |
| 6,324,848 B1 | 12/2001 | Gladden et al. | 60/612 |
| 6,327,980 B1 | 12/2001 | Chen et al. | |

(Continued)

FOREIGN PATENT DOCUMENTS

DE        28 49 054 A1 *   5/1980   .............. G01L/9/04

Primary Examiner—Thai-Ba Trieu
(74) Attorney, Agent, or Firm—Senniger Powers Carl Rowold

(57) ABSTRACT

The invention is an apparatus and method for detecting and responding to a surge event in a locomotive engine system including a turbocharger and a diesel engine. A sensor detects an operating parameter of the turbocharged engine and generates a signal indicative of the detected operatng parameter. An engine control system is responsive to the signal representative of a sensed operating parameter, or a determined changed in a sensed parameter, for controlling a plurality of operational controls of the diesel engine system. The engine control system modifies one or more operational controls of the diesel engine system when the signal indicates a surge event.

32 Claims, 6 Drawing Sheets

U.S. PATENT DOCUMENTS

| | | |
|---|---|---|
| 6,354,269 B1 | 3/2002 | Saito et al. |
| 6,377,876 B1 | 4/2002 | Hedeen et al. |
| 6,405,705 B1 | 6/2002 | Dunsworth et al. |
| 6,415,606 B1 | 7/2002 | Bowman et al. ............... 60/602 |
| 6,434,938 B1 * | 8/2002 | Sun et al. ..................... 60/601 |
| 6,601,388 B1 * | 8/2003 | Gladden ..................... 60/606 |
| 6,609,375 B2 * | 8/2003 | Allen et al. .................. 60/608 |
| 6,647,723 B1 * | 11/2003 | Sun et al. ..................... 60/601 |
| 6,715,289 B2 * | 4/2004 | Mader ......................... 60/612 |
| 6,769,255 B2 * | 8/2004 | Nishiyama et al. ........... 60/602 |

* cited by examiner

APPARATUS AND METHOD FOR AUTOMATIC DETECTION AND AVOIDANCE OF TURBOCHARGER SURGE ON LOCOMOTIVE DIESEL ENGINES

BACKGROUND OF THE INVENTION

This application claims priority from U.S. Provisional Application No. 60/419,895, filed on Oct. 21, 2002

FIELD OF THE INVENTION

This invention relates generally to diesel-electric traction vehicles such as locomotives equipped with turbocharged diesel engine systems. More particularly, the invention relates to the detecting a surge event during the operation of a locomotive engine system and controlling the engine's operation in order to avoid additional surge events.

BRIEF DESCRIPTION OF THE PRIOR ART

In a conventional diesel electric locomotive, a thermal prime mover diesel engine is used to drive an electrical transmission comprising a generator that supplies electric current to a plurality of traction motors whose rotors are coupled to the axle wheel sets of the locomotive. The generator typically comprises a main three-phase traction alternator, the rotor of which is mechanically coupled to the output shaft of the diesel engine. When excitation current is supplied to field windings of the alternator by an excitation control, alternating voltages are generated in three-phase armature windings of the alternator. These voltages are rectified and, in the case of DC traction motors, applied to the armature windings of the traction motors, or in the case of AC traction motors, applied to inverters for suitable AC conversion prior to being applied to the AC motors.

The operation of the locomotive unit is governed by a control system. Control signals pass from the control system to various engine and electrical transmission components/devices that control the operation of the engine components and the electrical operation of the alternator and traction motors. Typically, the control system receives information from sensors associated with various engine and electrical transmission system components and applies this information to engine control software to determine engine control requirements.

In normal motoring operation, the propulsion system of the diesel electric locomotive is controlled to establish a balanced steady state condition wherein the engine driven alternator produces, for each discrete position of a throttle, a substantially constant optimum amount of electrical power for the traction motors. For maximum performance, the electrical power output of the traction alternator must be suitably controlled so that the locomotive utilizes full engine power. For proper train handling, intermediate power output levels are provided to permit graduation from minimum to full output. Historically, locomotive control systems have been designed so that the operator or control system can select the desired level of traction power, in discrete steps between zero and a maximum level, so that the engine develops whatever level of power the traction and auxiliary loads demand.

The desired engine speed is set, within permissible limits, by a manually operated handle of a throttle or by the controller system such that the throttle can be selectively moved in eight steps or "notches" between a low power position (N1) and a maximum power position (N8). In addition to the eight conventional power notches, the throttle has an "idle" position and a "shutdown" position. As noted, the operation of the diesel engine is typically controlled to establish a balanced steady state condition wherein the diesel engine driven alternator produces, for each of these discrete positions of the throttle, a substantially constant amount of electrical power for the traction motors. As such, in operation, the diesel engine does not change speed for each notch setting. For a single engine speed, the electric power generated by the alternator and the electric power provided to the traction motors can be varied by the excitation control varying the alternator excitation setting. In a typical operation, for each particular engine speed, an alternator will have several excitation settings, each having a different level of excitation current being supplied to the field windings of the alternator's rotor. Each excitation setting varies the amount of AC power generated by the AC alternator at a particular engine speed. This "electric transmission" allows the diesel engine to operate at the most efficient speeds and horsepower for the particular design, multiple locomotive operations (referred to as "consist") and operating conditions.

For each of the different notch speed settings, the engine is capable of developing a corresponding constant amount of horsepower (assuming maximum output torque). For example, in one prior art locomotive, when the throttle notch 8 is selected, an engine speed of 1,050 rpm and maximum rated gross horsepower (hp) of 4,500 hp are realized. Under normal conditions, the engine power at each notch equals the power demanded by the electric propulsion system which is supplied by the engine-driven main alternator plus power consumed by certain electrically and mechanically driven auxiliary equipment.

When the throttle of the above-summarized locomotive is advanced from a relatively low notch to a higher power notch, the engine speed governor or controller responds by immediately increasing the amount of fuel injected into the engine cylinders in an attempt to increase engine speed to the new speed as set by the throttle. At the same time, the throttle commands the excitation control system to strengthen the field of the alternator so that the traction load on the engine increases to whatever magnitude is determined by the new throttle setting.

To increase the maximum amount of useful power that a locomotive engine of given size can develop when at a discrete speed, the usual practice is to equip the engine with a combustion air supercharger or turbocharger. In a typical turbocharger, a turbine is driven by engine exhaust gas. The turbine then drives a compressor that draws in ambient air and increases the pressure of intake air provided to the engine. This permits more fuel to be burned in the cylinder, and therefore the expanding products of combustion will exert more force on the piston during each power stroke. The main advantage of a turbocharger is that it increases the power output of a diesel engine by 30–50%. However, the addition of the turbocharger to the engine also increases that complexity of the operation of the engine and its control and maintenance.

One of the common control problems of a turbocharged diesel engine is turbocharger surge. Surge is a phenomena exhibited by centrifugal compressors of the type used in turbochargers in which the compressor becomes unstable at low compressor speeds and high boost pressures. Turbocharger surge is undesirable in engine operation and prolonged surging can lead to fatigue failure of engine components due to the large pulsations of pressure that repeatedly occur during surge. Operating efficiency is also degraded during surge due to the speed-up and slow-down of the turbocharger compressor. The performance of the turbocharger's compressor is usually represented by a graph of pressure ratio versus mass flow. The overall shape of the map, as defined by the constant engine speed lines and compressor speed lines, is based on measured performance of a turbocharger mated to a particular engine. In a typical compressor map, the left boundary of the compressor map defines a surge line that defines the limit of stable operation for the turbocharger or compressor. If the operation of the turbocharger results in a pressure ratio at a mass flow that is an operating point to the left of the surge line, airflow to the compressor is reduced thereby producing intermittent pulsations and interruption of steady airflow through the compressor. This condition is referred to as surge.

The turbocharger is normally designed for a particular engine to operate as close as possible to the compressor surge line in order to obtain maximum operating efficiency of the engine. In the initial system design, turbocharger surge is avoided by designing the compressor and engine combination such that the operating range of the diesel engine does not encroach on the surge line. A "surge margin" is the measure of how far the operating point lies from the surge line. Variables such as ambient conditions, degradation of system performance, or malfunctions within the engine system can reduce this "surge margin" and bring about unexpected and undesired turbocharger surging. The diesel electric locomotive encounters a large variety of ambient conditions and factors that degrade performance over the locomotive service life. Therefore, it is desirable to have a method and system to detect and avoid turbocharger surging during operation of the turbocharger and engine.

Compressor surge can be overcome by modifying the operation of the engine such that the pressure ratio across the compressor is reduced, or the mass flow through the compressor is increased, thereby shifting the operating position down and/or to the right of the surge line. Techniques for increasing the surge margin may include changing the turbo diffuser characteristics, utilizing a compressor discharge bypass valves, turbine exhaust waste gates, increasing the flow through the cylinders with injection or valve timing, resolving excessively high combustion air temperatures, preheating inlet air in the case of cold ambient temperatures, or reducing turbocharger speed (and thereby compressor pressure ratio) with a turbine nozzle change. Additionally, a surge condition can be overcome by decreasing the engine load by reducing the alternator excitation, or by increasing the engine speed to thereby increase the mass airflow through the turbocharger. For a particular turbocharger and engine arrangement, an increase in the engine speed shifts the operating line away from the surge line (down and to the right) by increasing mass airflow and slightly reducing pressure ratio across the compressor.

Other solutions to turbocharger surge have included design modifications to the turbocharger and to the turbocharger control systems. However, such design modifications are expensive and are primarily beneficial in applications where the engine speed must be varied often, and where acceleration of the vehicle is a primary consideration. As such, they are not particularly well suited for application to a turbo-charged diesel locomotive engine. Additionally, these systems increase the cost and complexity of the turbocharger system and cannot easily be adapted to existing turbocharger engine systems. Furthermore, some systems such as exhaust waste gates are particularly expensive because they must be designed to operate in the harsh environment of the exhaust system.

In order to address abnormal conditions in turbochargers, systems have also been developed to provide for the diagnosis of the operation of turbochargers. U.S. Pat. No. 6,298,718, issued to Wang, discloses a system for diagnosing abnormal turbocharger compressor performance. Wang discloses sensors to monitor turbocharger operation with respect to a compressor map stored in memory to abnormal operations such as surge or choke. Data is sampled for boost pressure, ambient pressure, ambient temperature, turbocharger speed, and mass airflow. This sensed data is put through a rationality test. If the data passes the rationality test, the data is used to calculate the operating-point of the turbocharger with respect to the compressor map using polynomial relationships. The sampled data is also used to detect surge or choke cycles occurring within the turbocharger. Wang discloses that a compressor surge condition can be predicted using the third order polynomials which characterizes the number of times the difference between the calculated and detected mass air flow changes sign over a short duration of time. In other words, Wang discloses modeling a rapid passage of the compressor performance back and forth across the surge line or the number of surge line crossings can be counted over a specified period of time to indicate the onset of a surge condition. When a surge condition is determined, the system may provide a warning to the operator or an error signal to the control system that can then make appropriate changes to the engine operating parameters. However, this prior art system is limited in application as the system attempts to predict surge based on a calculated map and attempts to analytically determine if surge is occurring. Wang does not directly detect turbocharger surge. As such, surge may not actually be occurring. Variations in the operation of the system and the environment over time cannot be predicted and included into Wang's analytical process. Furthermore, this prior art system requires the input from numerous operating sensors, many of which are not present on current locomotive diesel engines.

As noted, there is a need to detect the occurrence of a surge condition in a turbocharger and to adjust the operation of a diesel engine to avoid further surge conditions. Generally, prior art systems do not provide effective operational adjustments to the operating locomotive diesel engine system to overcome surge conditions during operation. Prior art systems do not account for changes in the engine and turbocharger system over time which are not easily accounted for by up-front design or polynomial modeling. Prior art systems are not directly applicable to various existing engine and turbocharger configurations without requiring application or configuration specific modifications or adjustments. Additionally, prior art solutions to turbocharger surge, as identified above, do not provide a technically feasible alternative for a diesel locomotive. For example, mass airflow and turbocharger speed measurements, as well as hardware items such as waste gates, bypass valves, or variable geometry diffusers, are complex and traditionally unreliable in the harsh environment of locomotive service.

Thus, it is desirable to provide a system and method for effective real time detecting and avoiding of turbocharger surge in a diesel locomotive thereby allowing for a graceful recovery and optimum performance of the engine.

BRIEF DESCRIPTION OF THE INVENTION

The invention provides an improved system and method for detecting and avoiding turbocharger surge in a diesel engine of a locomotive.

In one form, the invention is an apparatus for detecting and responding to a surge event in a locomotive engine system including a turbocharger and a diesel engine. A sensor detects an operating parameter of the turbocharger or the engine and generating a sensor signal indicative of the detected operating parameter. An engine control system responds to the sensor signal for controlling a plurality of operational controls of the diesel engine system. The engine control system modifies one or more operational controls of the diesel engine system when the sensor signal indicates a surge event.

In another form, the invention is an apparatus for detecting operating parameters indicative of a surge event in a turbocharger of a locomotive engine system including a diesel engine and the turbocharger and controlling the operation of the engine system to reduce turbocharger surge. A sensor detects an operating parameter of engine system indicative of a surge event and generates a sensor signal indicative of the detected operating parameter. An engine control system responds to the sensor signal for controlling a speed of operation of the diesel engine. When the engine system experiences a surge event, the engine control system increases the speed of the diesel engine to reduce turbocharger surge.

In yet another form, the invention is a locomotive driven by a locomotive engine system having a turbocharger and a diesel engine. The engine is operable at a plurality of discrete speeds. A sensor detects an operating parameter of the turbocharger and/or the engine and generates a sensor signal representing the detected operating parameter. An engine control system controls the speed of the diesel engine at a discrete speed that corresponds to a notch position of a throttle. The engine control system responds to the sensor signal and increases the speed of the diesel engine from a first discrete speed at which the diesel engine is operating to a higher discrete speed when a change in the sensor signal over time indicates a surge event of the turbocharger.

In another form, the invention is an apparatus for detecting and responding to a surge event in a turbocharger of a locomotive driven by a diesel engine. A sensor detects an operating parameter of the turbocharger or the engine and generates a sensor signal representing the detected operating parameter. An engine control system controls a speed of the diesel engine corresponding to a position of a throttle. The engine control system responds to the sensor signal and increases the speed of the diesel engine when the sensor signal indicates two surge events within a defined period of time.

In another form, the invention is a locomotive propulsion system comprising a variable-speed diesel engine system having a combustion air intake manifold and an exhaust manifold. A fuel controller supplies diesel fuel to the engine cylinders. A turbocharger is connected to both of the exhaust and intake manifolds of the engine and has a turbine that is driven by the engine exhaust gases. The turbine in turn drives a compressor for supplying pressurized air to the intake manifold. An engine speed sensor senses the speed of the engine. An electric power transmission system is mechanically driven by the engine. An excitation controller controls the power output of the generator system. A sensor is equipped to sense an operating parameter of the turbocharger or the engine and equipped to generate a sensor signal representing the sensed operating parameter. A controller is adapted to receive the generated sensor signal for increasing the engine speed from a first discrete speed to another discrete speed for a predetermined period of time when a change in the sensor signal over time indicates a surge event.

In yet another form, the invention is a method for detecting and controlling a surge event of a locomotive engine system including a turbocharger and a diesel engine operable at a plurality of discrete speeds. The method includes sensing an operating parameter of the engine system and determining a change in the sensed operating parameter indicative of a surge event. The invention further controls an operational control of the engine system in response to the determined change.

In another form, the invention is a method for detecting and controlling a surge event of a diesel engine in a locomotive engine system including a turbocharger and a diesel engine operable at a plurality of discrete speeds of operation. The method includes sensing an operating parameter of the engine system and determining the occurrence of a surge event in the turbocharger wherein a change in the sensed operating parameter over time is indicative of a surge event. The method controls the speed of operation of the diesel engine to increase the speed of the engine from a first discrete speed to a second discrete speed for a predetermined period of time when the occurrence of a surge event is determined and thereafter decreasing the speed of the diesel engine to the first speed. The method monitors for a further surge event after increasing the speed of the engine and within a predetermined period of time. The method generates a signal indicative of a surge event when a further surge event occurs during the predetermined period of time.

The invention addresses the limitations of the prior art systems by detecting turbocharger surge as it occurs and adjusting the speed of the engine to avoid the further occurrence of surge. The present invention may utilize existing hardware and controls located onboard current locomotives. The invention also only imposes minimal operational impacts on locomotive operation, emissions, and fuel consumption by taking action only when a surge is actually detected. As such, engine performance can be optimized in real time by allowing the engine to operate closer to the surge line under the majority of operating conditions. Additionally, the invention provides a solution that can be applied to all engine and turbocharger configurations with minimal modification or adjustment being required for a particular application or configuration.

Other forms and features of the invention will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
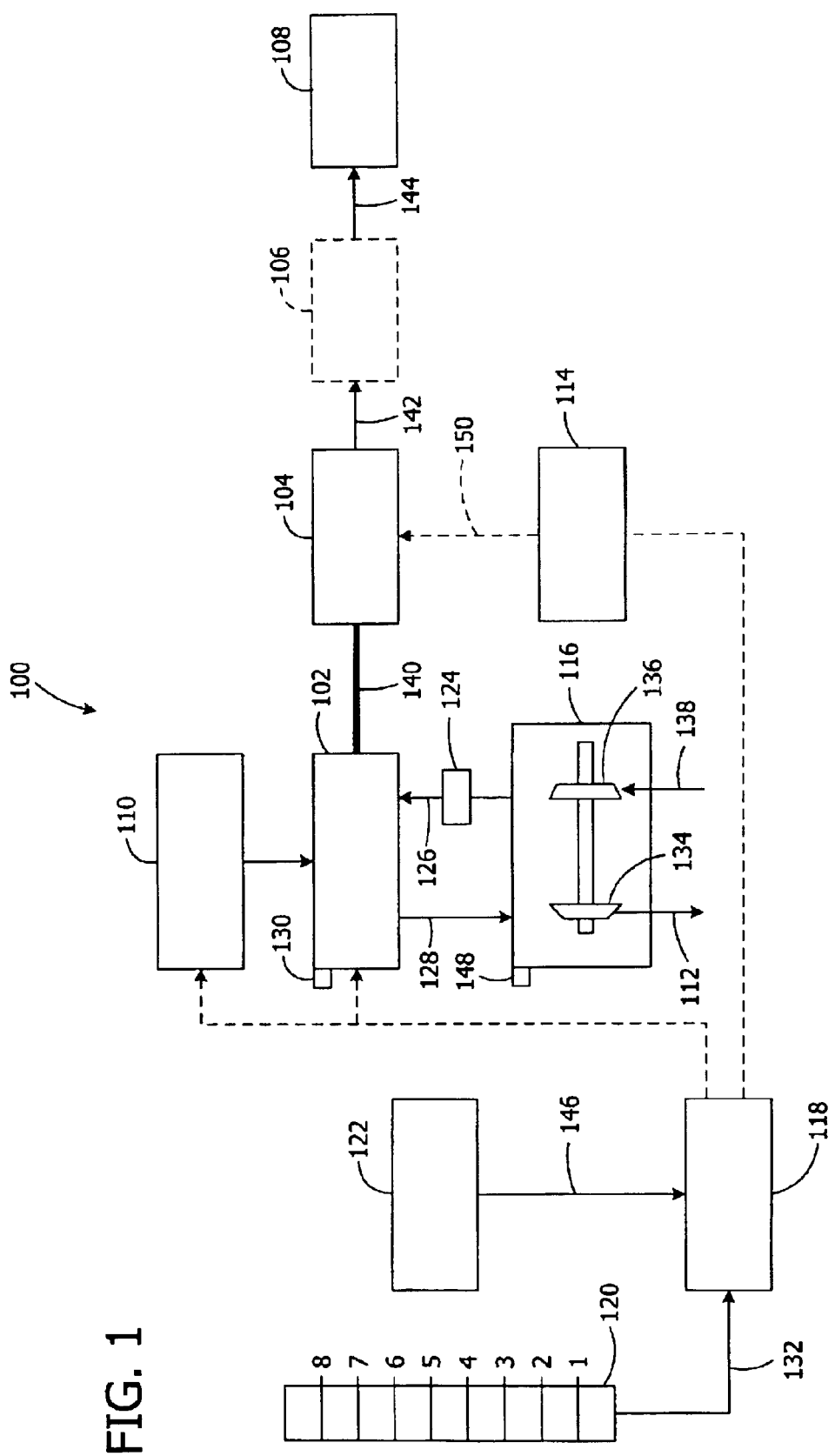
FIG. 1 is an illustration of a diesel electric locomotive according to one aspect of the invention comprising a diesel engine, an alternator, traction motors, a turbocharger, and a controller.

Referring to FIG. 1, in a diesel electric locomotive 100, a diesel engine 102 is used to drive an electrical transmission comprising a generator 104 that supplies electric current to a plurality of traction motors 108 whose rotors are coupled to the axle wheel sets of the locomotive (not shown). The generator 104 typically comprises a main three-phase traction alternator 104, the rotor of which is mechanically coupled to the output shaft 140 of the diesel engine 102. When an excitation current 150 is supplied to field windings of the alternator 104 by an excitation controller 114, alternating voltages 142 are generated in the alternator 104. These voltages 142 are rectified to DC power and, in the case of DC traction motors, applied to the DC traction motors 108. In the case of AC traction motors 108, the DC voltage is applied to an inverter 106 that provides suitable AC excitation energy 144 to the AC motors 108.

Figure 2:
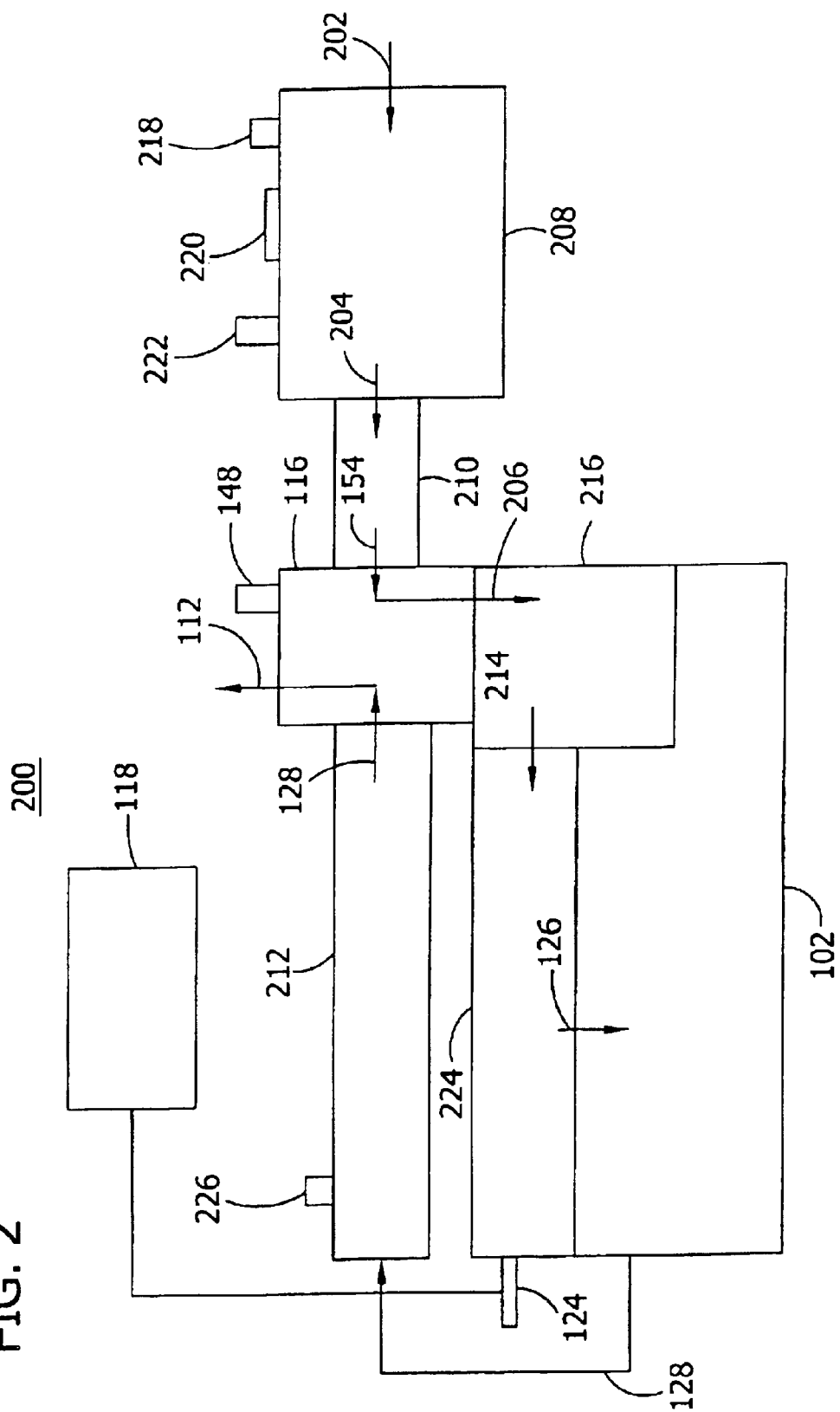
FIG. 2 is an illustration of one aspect of a turbocharger in relation to a diesel engine showing the flow of exhaust gas and intake air to the turbocharger.

FIG. 2 is an illustration of a locomotive engine system 200 according to one aspect of the invention that includes a turbocharger 116 and a diesel engine 102. FIG. 2 illustrates the flow of exhaust gas and intake air to the turbocharger 116 and engine 102. Referring to FIGS. 1 and 2, an engine 102 has an intake manifold 224 and an exhaust manifold 212. Exhaust gas 128 from the engine 102 exits the engine 102 from the exhaust manifold 212 and enters a turbocharger 116. The exhaust gas 128 turns a turbine 134 of the turbocharger 116 then exits the turbocharger 116 as exhaust gas 112 that exists to ambient air. Within the turbocharger 116, the turbine 134 is mechanically connected to a compressor 136. Ambient air 138 is drawn into the compressor 136 at turbocharger air inlet 210 from the air intake plenum 208. Compressed air 206 leaves the compressor 136 of the turbocharger 116 and enters an intercooler 216. From the intercooler 216, the intercooler air 214 enters the intake manifold 224 and is provided at 126 to the cylinders of the engine 102.

Referring again to FIG. 2, the arrows indicate the airflow through the various component parts of the diesel electric locomotive engine system 200 equipped with a turbocharger 116. The airflow begins with ambient air 202 that is drawn in at the air plenum 208. From the air plenum 208, the air flows at 204 into the turbo air inlet 210 at 154 and then flows into turbocharger 116 at 138. After the compressor 136 compresses the air, the compressed air 206 enters the intercooler 216. The intercooler 216 provides the compressed intercooler air 214 to the intake manifold 224. The intake manifold 224 delivers the compressed air 126 to the engine 102. After the air is ignited in the cylinders of the engine 102, the exhaust gas 128 is delivered to the exhaust manifold 212 that delivers the exhaust gas 128 to the turbine 134 in the turbocharger 116. After the exhaust gas 128 flows through the turbocharger's turbine 134, the exhaust gas 112 is delivered by the engine exhaust system (not shown) to ambient air.

Engine controller 118 controls the operation of the engine 102 and receives an input signal 146 from sensors 122 for sensing various operating parameters associated with the engine 102, the electrical transmission system, and the turbocharger 116. The sensors 122 sense operating parameters such as manifold air pressure (MAP), manifold air temperature (MAT), fuel value, turbocharger speed, vibration, deflection, engine horsepower, wheel slip, and mass airflow at the air intake manifold. For example, FIGS. 1 and 2 illustrate an air intake manifold transducer 124 associated with the intake manifold 224 to measure the manifold air pressure 126. Other examples are a turbocharger speed sensor 148, a pressure transducer 222 associated with the air plenum 208, a strain gauge 218 associated with the air plenum 208, an accelerometer 220 also associated with the air plenum 208, and a pre-turbine pressure transducer 226 located in the exhaust flow from the exhaust manifold 212 to the turbocharger 116. Other sensors 122 that sense the operating conditions of an engine 102, turbocharger 116 and electrical transmission system of a diesel electric locomotive 100 can also provide the engine controller 118 with input signals 146 and are anticipated by the invention, but are not shown in the figures.

The engine controller 118 controls one or more engine system operational controls. Examples of engine system operational controls include the engine speed, the fuel injection advance angle, injection timing, intake cooling system, valve/camshaft timing, diverter valve activation/deactivation, exhaust valve activation/deactivation, and engine load as provided by the electrical transmission system and as further controlled by the excitation controller 114.

Figure 3:
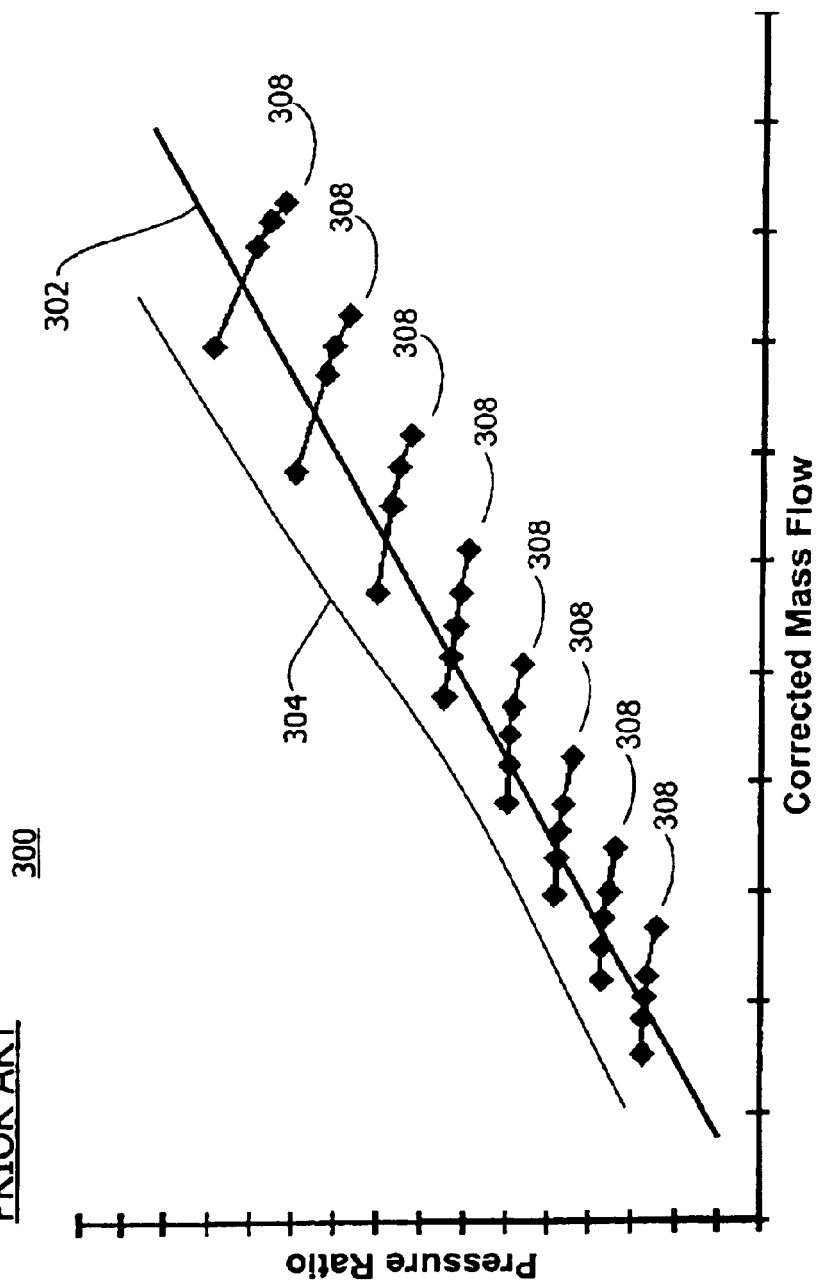
FIG. 3 is a graphical representation of a typical prior art turbocharger compressor map that depicts the engine operating line and the turbocharger surge line as functions of a pressure ratio and a corrected mass flow.

In locomotive 100, a particular engine 102 and turbocharger 116 design and/or arrangement results in a particular turbocharger performance map. As shown in FIG. 3, 300 is a graphical representation of a typical prior art turbocharger compressor map that depicts the engine operating line and the turbocharger surge line as functions of a pressure ratio and a corrected mass flow. In this representation, turbocharger compressor map 300 is represented as a function of pressure ratio and corrected mass flow through the compressor. The overall shape of the map 300, as defined by the constant engine speed lines and compressor speed lines, is based on measured performance of a turbocharger 116 mated to a particular engine 102. As shown in FIG. 3, the vertical axis is the pressure ratio and the horizontal axis is the corrected mass flow. A surge line 304 defines the limit of stable operation for the turbocharger 116. An operation of the turbocharger 116 above or to the left of the surge line 304 results in airflow to the compressor that is reduced thereby producing intermittent pulsations and interruption of steady airflow through the compressor. The speed of the turbocharger 116 in revolutions per minute (rpm) is represented by a group of curved lines 308 near the surge line. Each line 308 represents an operating range for a constant turbocharger speed. The turbocharger speed lines 308 shift depending on the pressure ratio and the corrected mass flow as indicated by each line 308. The engine's operating line 302 is a straight line extending upwardly from the left to the right and indicates the operating performance of pressure ratio to corrected mass flow of the particular engine 102 and turbocharger 116 arrangement.

As noted, a turbocharger surge event occurs when the turbocharger 116 operates at a pressure ratio and corresponding corrected mass flow that is above surge line 304. However, the compressor map and surge line 304 are graphical representations of the design and performance characteristics of a turbocharger's operation. While the compressor map is informative of the operating characteristics of a turbocharger 116 and engine 102, the pressure map useful in that it illustrates surge events during the operation of engine 102 and turbocharger 116.

In one embodiment, the invention determines, during the operation of the engine 102 and turbocharger 116, when a surge has actually occurred. To improve the performance of the engine system 200, the operation of the engine 102 is adjusted to avoid the further occurrence of a surge event. In one embodiment, in order to avoid further surging, when the engine controller 118 detects a surge condition, the engine controller 118 increases the engine speed. The increase in engine speed results in a shift of the operating line down and to the right, such that the operating line 302 is further from the surge line 304. As noted above, other engine system operational controls may also be controlled to modify the engine system 200 operations to avoid further surge events.

In one embodiment of the invention, the engine control system 118 or controller increases the speed of the diesel engine 102 when the sensor signal 146 indicates more than one surge event within a defined period of time. For example, in one embodiment, if two surge events are determined to have occurred within a period of one minute, the control system 118 increases the speed. However, other embodiments identify quantities of surge events of one or a discrete number more than one. Additionally, the defined period of time for such multiple surge events are from a fraction of one second to more than five minutes.

In one embodiment, sensor 122 is a manifold air pressure transducer 124 associated with an intake manifold 224 of the diesel engine 102. The sensor signal 146 represents the manifold air pressure within the intake manifold 224. In such an embodiment, the sensing of the turbocharger 116 surge event involves detecting a rapid pressure fluctuation resulting from the flow reversal within the engine air intake system 224, 216, 116, 210 or 208. The pressure fluctuation can be detected with any pressure transducer 124 or 222 associated with the intake air stream from the air inlet 210, the intercooler 216, or the inlet manifold 224. In such an embodiment, the engine control system 118 may increase the speed of the diesel engine 102 when the sensor signal 146 indicates a short duration but relatively large decrease, commonly referred to as a downward spike, in the air pressure of the intake manifold 224. Such a downward spike is of any amplitude or duration such as to discretely define a surge event. For example, in one embodiment, the engine control system 118 increases the speed of the diesel engine 102 when the sensor signal 146 indicates the air pressure within the intake manifold 224 has decreased by 8 pounds per square inch (psi), followed by an increased by in air pressure of 4 psi occurring within one second of the 8 psi decrease. Other embodiments may indicate a decrease in the manifold air pressure in the range of 1 psi to 7 psi, or a range of 2 psi to 6 psi. A subsequent recovery or increase of air pressure may be in the range of 1 to 4 psi, or in another embodiment the range of recovery may be 2 psi to 3 psi. Such a recovery occurs following the initial decrease in manifold air pressure of greater than 2 psi within a time frame of between a 100 milliseconds to five seconds. Other ranges of a decrease in pressure and subsequent increase in pressure are possible within a range of time periods to uniquely identify that a change in air pressure over time indicates that a surge has occurred in the turbocharger 116. For example, the range of time may be between one half second and three seconds or in another embodiment may be between one second and two seconds.

In another embodiment, the sensor 122 is a turbocharger speed sensor 148 that detects a rotational speed of the turbocharger 116. In this embodiment, the sensor signal 146 represents the rotational speed of the turbocharger 116 and the engine control system 118 increases the speed of the diesel engine 102 when the sensor signal 146 indicates a predetermined amount of change in the turbocharger speed over a predefined period of time. In one embodiment, the engine control system 118 may increase the speed of the engine 102 when the turbocharger speed increased in the range of 100 to 2000 rpm within one minute. Other embodiments include a speed increase of 200 rpm to 1900 rpm or a range between 100 and 2000 rpm that indicate a surge. Such a predefined period of time may be fractions of a second to more than one minute. For example, one embodiment is a change in turbocharger speed of 200 rpm over a period of one second.

In other embodiments, a surge manifests as a change in the forces associated with the air intake system of the turbocharger 116. In a typical locomotive system 200, the air plenum 208 and turbocharger air inlet 210 are comprised of sheet metal ducting. When a surge event occurs, the change in airflow and pressure results in a change in the vibration and/or deflection of the sheet metal. As such, it is possible to detect a turbocharger surge by associating one or more sensors with the air intake system to sense a change to the vibration of the sheet metal. In another embodiment, the sensor senses a change of the deflection of the sheet metal by a specified range in a specified period of time. For example, a strain gage 218 or an accelerometer 220 associated with a surface of the air inlet 210 or air plenum 208 will sense the change in vibration of the surface within a preset period of time or a deflection greater than a predetermined amount. When the control system 118 determines that a change in the vibration or the deflection indicates a surge event, the control system 118 increases the speed of the engine 102.

In another embodiment, a pressure transducer 222 associated with the air inlet 210 or the air plenum 208 senses the air pressure of the air entering the turbocharger 116. In this case, when a surge occurs in the turbocharger 116, a change in the mass airflow pressure at the air intake 210 or 202 to the turbocharger 116 indicates the surge event. This change can manifest itself as a rapid change in the air pressure signal as generated by air inlet pressure transducer 222, or can be an increase or decrease in the air pressure over time.

In an alternative embodiment, the controller 118 monitors more than one operating parameter and controls the speed of the engine 102 when a combination of the operating parameters indicate that a surge event has occurred and that another factor such as wheel slip has not occurred. In one alternative, manifold air pressure and wheel slip are the operating parameters being sensed. If a change over time of the air pressure indicates a short duration but relatively high change in air pressure, such as a spike, but at the same time the wheel slip sensor signal indicates that wheel slip is occurring, the controller 118 may determine that a surge has not occurred. Other combinations of operating parameters are possible and may be utilized to determine the occurrence of a surge event in the turbocharger 116.

Additionally, other sensors 122 associated with the operation of diesel engine 102 can sense other operating parameters. For example, the manifold air temperature (MAT), the fuel value, the engine horsepower and ambient air pressure (as measured by a barometer) can be sensed. The sensor signals 146 for these operating parameters can also be used by the engine control system 118 to determine if and when a surge event has occurred or to diagnose other problems with the operation of the engine 102 or turbocharger 116. For example, if in one embodiment a surge condition is indicated by the occurrence of three downward spikes in the manifold air pressure, a surge condition is possible. However, if it is also determined that the manifold air temperature (MAT) is high, the intake air pressure is low, and the ambient air pressure indicates a low altitude, the controller may determine that there is a problem with the locomotive cooling system or intercooler 216.

In yet another embodiment, more sophisticated mathematical analysis of the sensor signal 146 can be used to determine a surge event from the sensor signal 146. For example, a Fourier transform analysis can be used to determine the frequency domain values of the sensor signal 146. One such embodiment of the invention characterizes the expected frequencies during typical operation and characterizes the surge events. Other mathematical analysis can also be used to determine surge events and are anticipated by the current invention.

A method according to this embodiment may determine the occurrence of a surge when it is determined that three surge events within a defined period of time has occurred. In other embodiments, various other surge events of one or greater may be used to determine the occurrence of a surge. Additionally, the defined period of time may vary from one embodiment to another wherein the defined period of time is fractions of a second to more than five minutes. One specific embodiment is where the period of time is one minute.

In one embodiment, a locomotive 100 is driven by a diesel engine 102 having a turbocharger 116. The diesel engine 102 operates at a plurality of discrete speeds. A sensor 122 detects an operating parameter of the turbocharger 116 and/or the engine 102 and generates a sensor signal 146 representing the detected operating parameter. An engine control system 118 controls the speed of the diesel engine 102 at the discrete operating speeds, each of which corresponds to a notch position of a throttle 120. The engine control system 118 is responsive to the sensor signal 146 and increases the speed of the diesel engine 102 from a first discrete speed at which the diesel engine 102 is operating to a higher discrete speed when a change in the sensor signal 146 over time indicates a surge event of the turbocharger 116.

Figure 4:
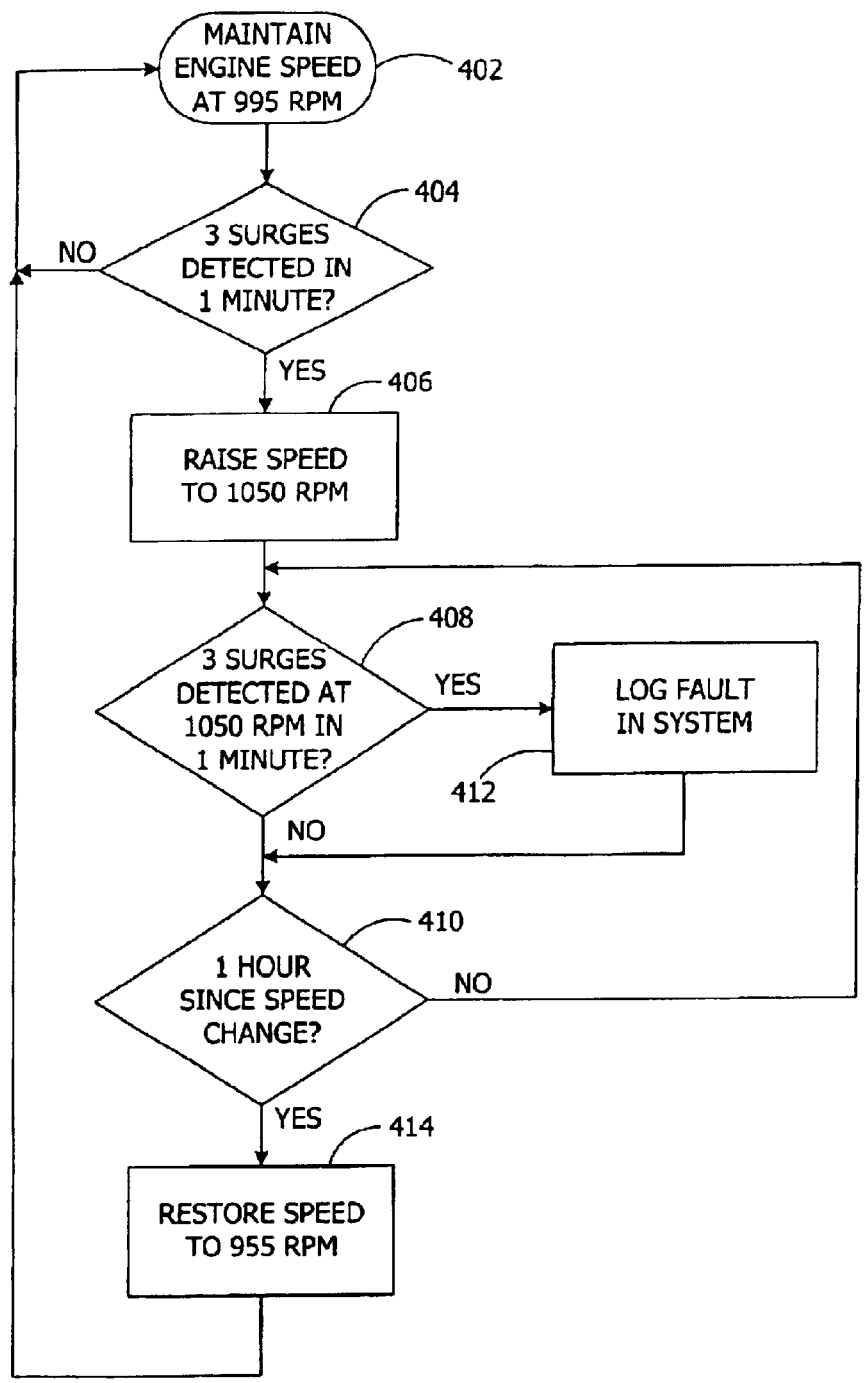
FIG. 4 is a logic flow chart for an exemplary turbo surge detection and avoidance system and method according to one aspect of the invention.

FIG. 4 illustrates a logic flow chart 400 for an exemplary turbo surge detection and avoidance system and method according to one aspect of the invention. For example, in one embodiment the diesel engine 102 operates at a speed of 995 revolutions per minute (rpm) 402. At 404 the engine control system 118 monitors sensor signal 146 for the occurrence of three surge events. If three surge events are indicated within a defined period of time such as one minute, the engine control system 118 increases the speed of the diesel engine 102 to 1050 rpm. The engine control system 118 continues to detect surge events as indicated by the sensor signal 146. As indicated at 408, the predetermined time after increasing the speed of the engine 102 from 995 rpm to 1050 may be, in one embodiment, one hour 410. If one hour elapses and no further surge events are detected, the engine control system 118 restores the engine speed to 995 rpm, the speed of the engine 102 prior to the increase 414. If, however, during the predetermined period of time after increasing the speed of the engine 102, three surges are again detected with a defined period of time such as one minute, the engine control system 118 logs a fault in the system, stores the occurrence of the event in a memory (not shown), or generates a fault signal or message 412. In the embodiment where a surge event is detected during the predetermined period of time, the engine control system 118 continues to control the speed of the engine 102 at the increased speed for the predetermined period of time. Once the predetermined period of time lapses 410, the engine control system 118 restores the engine speed to the first speed, for example back to 995 rpm.

Another aspect of this invention may be encountered where surge was detected and the engine speed increased. If during the predetermined period of time, the operator or the control system 118 reduces the throttle 120 setting from throttle position corresponding to an engine speed of 995 rpm to a throttle setting corresponding to a speed less than 995 rpm, the engine 102 reduces speed to the new throttle setting. However, if the throttle 120 is increased thereafter to a higher throttle setting that again corresponds to the engine speed of 995 rpm and the predetermined period of time has not yet lapsed, the engine 102 automatically increases, not to the 995 rpm speed, but increases to the 1050 rpm speed, until the lapse of the predetermined period of time. In other words, in one embodiment, the predetermined period of time and the speed increase from one speed to a next higher speed would continue for all throttle settings therein requiring the first engine speed.

In another embodiment, when a surge is detected the engine control system 118 increases the speed of the turbocharger 116 in discrete steps until turbocharger surge is eliminated. For example, when a first turbocharger surge condition is detected, the speed of the engine 102 may be increased by a discrete speed of 10 rpm. During the predetermined period of time, the system continues to monitor for surge. If a second turbocharger surge condition is detected, the speed of the engine 102 is increased again by an additional discrete speed of 10 rpm. This process is continued until surge conditions no longer occur during the predetermined period of time or until a predefined maximum speed increase is achieved. For example, in one embodiment if operating at 995 rpm, the discrete speed steps are 1005 rpm, 1015 rpm, 1025 rpm, 1035 rpm, 1045 rpm and 1050 rpm. 1050 rpm may be the maximum engine speed. In such an embodiment, if continued surges were detected, no further speed increases are incurred and a report is logged for future maintenance action or a signal is generated indicative of the surge event and the related parameters. In other embodiment, the discrete steps may be more or less than 10 rpm and the maximum rpm may be more or less than 1050 rpm.

Figure 5:
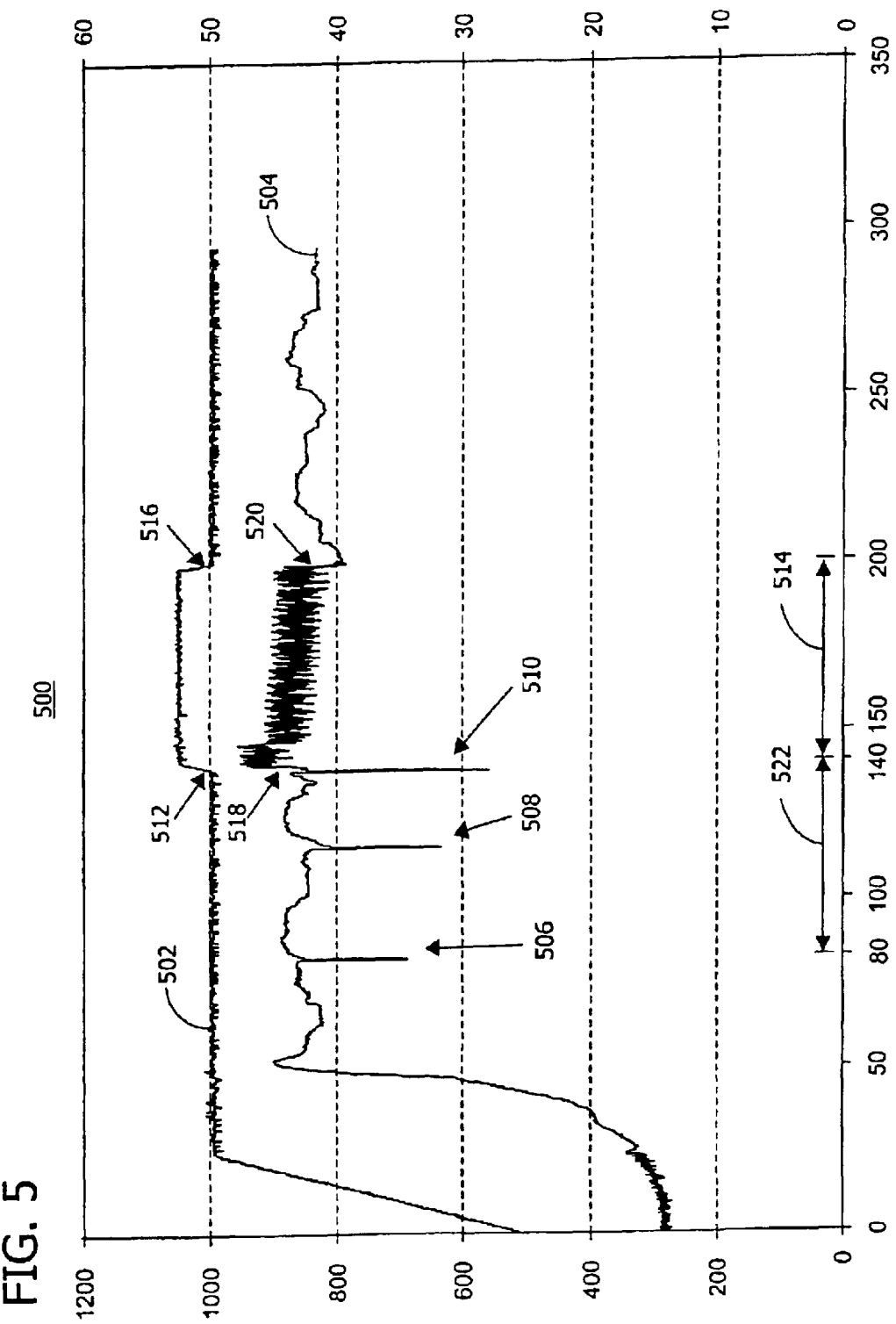
FIG. 5 is an exemplary graphical mapping indicating the speed of the diesel engine and the associated manifold pressure signal from a manifold air pressure transducer according to one aspect of the invention.

FIG. 5 illustrates an exemplary operation of one embodiment of the system and method. The scale on the left vertical axis from 0 to 1200 denotes the engine operating speed in revolutions per minute and the horizontal axis denotes time beginning at 0. In this example, line 502 indicates the engine's operating speed. After initial engine 102 start up, line 502 depicts the engine operating at 995 rpm. A line 504 illustrates the manifold air pressure signal 504 over the same time period. The scale for line 504 indicating the manifold air pressure signal is shown on the right vertical scale from 0 to 60 psi. Line 504 shows the manifold air pressure increasing after engine startup up to a value in the range of 40 to 50 psi. As discussed above, a surge condition can be determined where there are one or more surge events occurring within a predetermined period of time. For example, in FIG. 5 and according to one embodiment of the invention, a surge condition is determined when there are three surge events as indicated by three downward spikes in the manifold pressure signal 504 within time period 522. The engine control system 118 determines that there is a first surge event 506, a second surge event 508 and a third surge event 510 that occurs within a predetermined period of time as indicated here as period 522. According to one embodiment of the invention, when three surges events 506, 508 and 510 occur within time period 522, the engine control system 118 increases the engine speed. This is depicted in FIG. 5 at 512 where the engine's speed is increased from the first discrete speed of 955 rpm to a higher discrete speed of 1050 rpm. The engine control system 118 maintains the operation of the engine 102 at this higher engine speed until a predetermined period of time 514 has lapsed. After the lapse of period 514, the engine speed is decreased at 516 to the lower first speed of 955 rpm. The effect of this aspect of the invention is also shown in the change of the manifold pressure signal 504. During the predetermined period of time 514, the air pressure signal 504 increased at 518 until the lapse of predetermined time 514 wherein the manifold pressure signal reduces at 520. As depicted by air pressure signal 504, no additional surge event as shown here, e.g. a downward spike in the air pressure signal, occurs during the predetermined time 522. Furthermore, FIG. 5 depicts the long-term benefit of this aspect of the invention, as after the lapse of the predetermined period of time 514 and after the engine speed 502 is returned to the first engine speed of 955 rpm, the manifold pressure signal 504 does not indicate further surge events.

Figure 6:
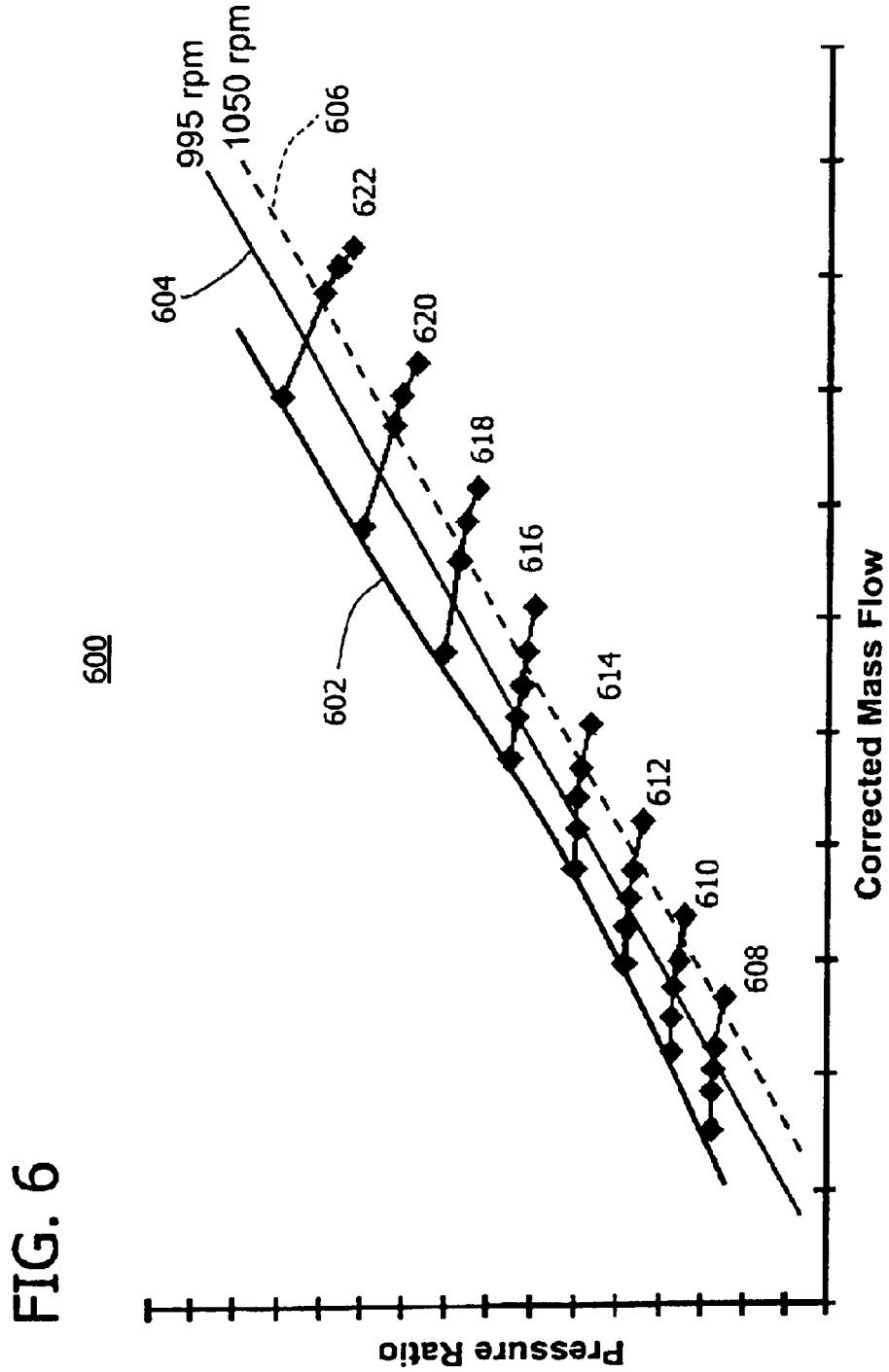
FIG. 6 is an exemplary graphical representation of a turbocharger compressor map depicting the shift in the operating line of the compressor away from the surge line based on a change of the engine speed from 995 rpm to 1050 rpm, according to one aspect of the invention.

In this embodiment, the increase in the engine speed from 955 rpm to 1050 rpm can be graphically represented as a shift of the operating line of the engine 102 as represented on a compressor map. FIG. 6 is an exemplary graphical representation of a turbocharger compressor map 600 depicting a surge line 602 which identifies an upper boundary of pressure ratio to corrected flow mass. Operating above or to the left of surge line 602 results in turbocharger surge. Also depicted in FIG. 6 is an engine operating line 604 where the engine 102 is operating at 995 rpm. Map 600 also depicts constant turbocharger speed lines 608 to 622 indicating the turbocharger speeds ranging from 14,000 rpm to 21,000 rpm by 1,000-rpm increments. FIG. 6 depicts the shift of operating line 604 at an engine speed of 995 rpm to operating line 606 when the engine speed is increased to 1050 rpm. As shown in FIG. 6 and according to the invention, the increased engine speed results in shifting the operating line from 604 to 606 which is down and to the right away from surge line 602. This results in an increased surge margin for the same turbocharger speed. The surge margin is the distance between the operating line 606 and the surge line 602. This represents one embodiment of the invention as other embodiments as anticipated by this invention will result in other compressor surge maps and other changes in engine operating speed will result in other operating lines. Additionally, as noted below, the engine control system 118 can make change or adjust other engine 102, turbocharger 116, and/or electrical transmission system operational controls other than engine speed in order to avoid turbocharger 116 surges when a surge is detected or is predicted to occur. In such situations, the change may also be depicted with a graphical representation by using a compressor map representative of the benefit of such a change.

In another embodiment, the engine control system 118 increases the speed of the diesel engine 102 to a higher discrete speed for a predetermined period of time, such as for a period of between a fraction of one minute and four hours. After the lapse of such predetermined period of time, the engine control system 118 decreases the speed of the diesel engine 102 to the first speed. In one embodiment, this period of time is one hour. It should be appreciated, however, that other periods of time are suitable and are anticipated by this invention. For example, the predetermined period of time may be in the range of one minute to 3 hours, or in another embodiment is in the range of one half hour to 2 hours.

In another embodiment, the engine control system 118 continues to monitor the sensor signal 146 and continues to detect surge events that may occur after the engine control system 118 has increased the speed of the engine 102 and within the predetermined period of time. The engine control system 118 may detect the occurrence of a surge event after increasing the engine speed within the predetermined period of time. When such an event occurs, the engine control system 118 may generate a message or alert to an operator or administrative system (not shown), generate an alarm, or simply the log the occurrence of the surge event in a memory (not shown).

In another embodiment, a locomotive propulsion system 100 and 200 comprises a variable-speed diesel engine 102 having a combustion air intake manifold 224 and an exhaust manifold 212, a fuel controller 110 for supplying diesel fuel to the engine cylinders, a turbocharger 116 connected to both of the exhaust 212 and intake 224 manifolds of the engine 102 and having a turbine 134 that is driven by the engine exhaust gases 128 and that in turn drives a compressor 136 for supplying pressurized air 136 to the intake manifold 224, an engine speed sensor 130 for sensing the speed of the engine 102, an electric power generator system 104 mechanically driven by the engine 140, and an excitation controller 114 for controlling the power output of the generator system. This embodiment further comprises a sensor 122 equipped to sense an operating parameter of the turbocharger 116 or the engine 102 and equipped to generate a sensor signal 146 representing the sensed operating parameter. A controller 118 is adapted to receive the generated sensor signal 146 and for generating an engine speed control signal for increasing the engine speed from a first discrete speed to another discrete speed for a predetermined period of time when a change in the sensor signal over time indicates a surge event.

In another embodiment of the invention, a throttle 120 is operably connected via a train line 132 to the engine 102, and wherein the throttle has discrete operating positions 1 to 8 and wherein the controller 118 generates an engine speed control signal to increase the engine speed when the throttle 120 is located in one of notch positions 5, 6 or 7. In an alternative embodiment, the engine control system 118 increases the engine speed to the next available notch speed when a surge is detected. For example, the engine speed for notch settings 5, 6 and 7 may be 955 rpm and the engine speed for notch 8 may be 1050 rpm. If the throttle 120 is in notch position 5, 6 or 7 and a surge event is determined, the engine control system 118 increases the engine speed to 1050 rpm. In such an embodiment, if the throttle 120 is in notch 8, the highest operating notch, and it is determined that a surge event has occurred, the engine control system 118 does not increase the speed, as the engine 102 is already operating at the highest available speed. Rather, in this case, the engine control system 118 logs the occurrence of the surge in memory (not shown) and/or generates an alarm or message notifying the operator or an external operational support system (not shown) of the occurrence. In other embodiments, other throttle settings and other engine speeds operate in a similar manner consistent with this invention.

In another embodiment, the diesel engine 102 has a plurality of discrete operating speeds and is capable of operating at a plurality of discrete operating power levels. This embodiment comprises means for sensing an operating parameter of the turbocharger 116 or the engine 102. A determining means determines when a surge event in the turbocharger 116 has occurred. The determining means may be responsive to the sensed operating parameter over time. A controlling means controls the speed of the diesel engine 102 and increases the speed of the diesel engine 102 from a first discrete speed at which the diesel engine 102 is operating to a higher discrete speed for a predetermined period of time when the determining means determines that a surge event has occurred.

In another embodiment, the invention is a method for detecting and controlling a surge event of an engine system 200 in a locomotive 100 equipped with a turbocharger 116 and a diesel engine 102. The diesel engine 102 is operable at a plurality of discrete operating power levels and discrete speeds. In this embodiment, the method comprises sensing an operating parameter of the turbocharger 116 or the engine 102 and determining the occurrence of a surge event in the turbocharger 116 wherein a change in the sensed operating parameter over time indicates a surge event. The method further comprises controlling one or more engine system 200 controls in order to avoid further occurrences of surge events.

An additional method is to control the speed of the engine 102 to increase the speed of the engine 102 from a first discrete speed to a second discrete speed when the occurrence of the surge event is determined. Other controls include controlling the advance angle of the fuel injection and controlling the horsepower load on the engine system.

In another embodiment, controlling the speed of the engine 102 includes of increasing the engine speed to the higher discrete speed for a predetermined period of time and thereafter decreasing the speed of the diesel engine 102 to the first speed. As noted, this predetermined period of time may be any period of time as is predetermined to indicate a surge event is the particular operating parameter being monitored to detect surge. In one specific embodiment, the predetermined period of time is one hour when the monitored operating parameter is the manifold air pressure.

In another embodiment, the invention is a method for detecting and controlling a surge event of a diesel engine 102 in a locomotive 100 equipped with a turbocharger 116, the diesel engine 102 operable at a plurality of discrete speeds. In this embodiment, the method comprises sensing an operating parameter of the turbocharger 116 or the engine 102 and determining the occurrence of a surge event in the turbocharger 116 wherein a change in the sensed operating parameter over time indicates a surge event. The method further comprises controlling the speed of the engine 102 to increase the speed of the engine 102 from a first discrete speed to a second discrete speed for a predetermined period of time when the occurrence of a surge event is determined and thereafter decreasing the speed of the diesel engine 102 to the first speed. The method further comprises monitoring for a surge event after increasing the speed of the engine 102 and within a predetermined period of time, and when a surge event occurs during the predetermined period of time, initiating an action such as generating a message, generating an alarm or logging of the event in memory.

In an alternative embodiment, when a surge event is detected or occurs, the engine control system 118 may change other operational controls of the engine 102 or the electrical transmission system in order to avoid turbocharger surge. In one embodiment, the engine control system 118 may change the fuel injection advance angle to decrease the turbocharger speed. As shown in FIG. 6, a decrease in the turbocharger speed reduces the corrected mass air flow and pressure ratio which may increase the surge margin. Other actions may also be initiated by the engine control system 118 to reduce the backpressure on the compressor thereby decreasing the pressure ratio corresponding to a particular corrected mass flow. In one alternative embodiment, the engine control system 118 may adjust the horsepower rating of the electrical transmission system thereby adjusting the load on the diesel engine 102. The engine control system 118 may provide control signals to the excitation control 114 which decrease the AC excitation energy 144. By derating the horsepower of the engine 102, a decrease in the pressure ratio may occur thereby increasing the surge margin. In another embodiment, changes to the cooling system to reduce manifold air temperature will result in avoiding surge in the turbocharger. In yet another embodiment, where the engine system is equipped with a variable camshaft and/or valve timing, the engine control system can adjust the valve timing to optimize or increase flow through cylinders, which results in reduced occurrence of turbocharger surge. In yet other embodiments, a diverter valve on compressor discharge may be operated to reduce turbocharger surge.

In yet another embodiment of the invention, sensors associated with the manifold air pressure 124 and the turbocharger inlet pressure 222 may be used in combination to determine the operating ratio of pressure ratio to corrected mass flow, e.g., which may be graphically depicted as an operating point on a compressor map. In this embodiment, the engine control system 118 may have stored in a memory (not shown) stored data related to such ratios or combinations of pressure ratio to corrected mass flow. The engine control system 118 receives the sensor signals 146 from one or more sensors 122. The engine control system 118 compares the sensor signal data with the stored data and determines that a surge condition may be eminent. In such as case, the engine control system 118 increases the engine speed or change other engine or electrical transmission operating controls to avoid the turbocharger surge before it actually occurs. By determining the actual combination of combination of pressure ratio and corrected mass flow, the engine control system 118 may proactively control the operation of the engine 102 and electrical transmission system to prevent surge.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

While various embodiments of the present invention have been illustrated and described, it will be appreciated to those skilled in the art that many changes and modifications may be made thereunto without departing from the spirit and scope of the invention. As various changes could be made in the above constructions without departing from the scope of the invention, it is intended that all matter contained in the above description or shown in the accompanying drawings shall be interpreted as illustrative and not in a limiting sense.

What is claimed is:

1. A method for detecting and controlling a surge event of a locomotive engine system including a turbocharger and a diesel engine operable at a plurality of discrete speeds, the method comprising:

sensing an operating parameter of the engine system;

determining a change in the sensed operating parameter indicative of a surge event; and controlling a speed of the diesel engine in response to the determined change.

2. The method of claim 1, wherein increasing the speed of the engine comprises increasing the speed of the diesel engine from a first discrete speed to a second discrete speed for a predetermined period of time.

3. The method of claim 1, further comprising monitoring surge events after increasing the speed of the engine and logging a report or generating a signal indicative of a surge event when a surge event occurs within the predetermined period of time.

4. The method of claim 1, wherein controlling the speed of the engine is increasing the engine speed to the higher discrete speed for a predetermined period of time and thereafter decreasing the speed of the diesel engine to the first speed.

5. The method of claim 1, wherein sensing the operating parameter is sensing one or more of the parameters: manifold air pressure (MAP), manifold air temperature (MAT), fuel value, turbocharger speed, vibration parameter, deflection parameter, engine horsepower, wheel slip and mass air flow at the air intake manifold.

6. A method for detecting and controlling a surge event of a locomotive engine system including a turbocharger and a diesel engine operable at a plurality of discrete speeds, the method comprising:

sensing an operating parameter of the engine system;

determining a change in the sensed operating parameter indicative of a surge event; wherein determining the occurrence of a surge event includes determining the occurrence of three surge events within a defined period of time; and controlling an operational control of the engine system in response to the determined change.

7. A method for detecting and controlling a surge event of a locomotive engine system including a turbocharger and a diesel engine operable at a plurality of discrete speeds, the method comprising:

sensing an operating parameter of the engine system;

determining a change in the sensed operating parameter indicative of a surge event; and controlling an fuel injection advance angle of the engine system in response to the determined change.

8. A method for detecting and controlling a surge event of a locomotive engine system including a turbocharger and a diesel engine operable at a plurality of discrete speeds, the method comprising:

sensing an operating parameter of the engine system;

determining a change in the sensed operating parameter indicative of a surge event; and controlling a horsepower load on the engine in response to the determined change.

9. A method for detecting and controlling a surge event of a diesel engine in a locomotive engine system including a turbocharger and a diesel engine operable at a plurality of discrete speeds of operation, the method comprising:

sensing an operating parameter of the engine system;

determining the occurrence of a surge event in the turbocharger wherein a change in the sensed operating parameter over time is indicative of a surge event;

controlling the speed of operation of the diesel engine to increase the speed of the engine from a first discrete speed to a second discrete speed for a predetermined period of time when the occurrence of a surge event is determined and thereafter decreasing the speed of the diesel engine to the first speed;

monitoring for a further surge event after increasing the speed of the engine and within a predetermined period of time; and generating a signal indicative of a surge event when a further surge event occurs during the predetermined period of time.

10. An apparatus for detecting and responding to a surge event in a locomotive engine system including a turbocharger and a diesel engine the apparatus comprising:

a sensor detecting an operating parameter of the turbocharger or the engine and generating a sensor signal indicative of the detected operating parameter; and an engine control system responsive to the sensor signal far controlling a plurality of operational controls including a speed of the diesel engine, wherein the engine control system modifies one or more operational controls including the speed of the diesel engine when the sensor signal indicates a surge event.

11. An apparatus for detecting and responding to a surge event in a locomotive engine system including a turbocharger and a diesel engine the apparatus comprising:

a sensor detecting an operating parameter of the turbocharger or the engine and generating a sensor signal indicative of the detected operating parameter; and an engine control system responsive to the sensor signal for controlling a plurality of operational controls including a fuel injection advance angle of the diesel engine system, wherein the engine control system modifies the advance angle of the fuel injection system when the sensor signal indicates a surge event.

12. An apparatus for detecting and responding to a surge event in a locomotive engine system including a turbocharger and a diesel engine, the apparatus comprising:

a sensor detecting an operating parameter of the turbocharger or the engine and generating a sensor signal indicative of the detected operating parameter; and an engine control system responsive to the sensor signal for controlling a plurality of operational controls of the diesel engine including a horsepower rating of an electrical transmission system, and wherein the engine control system modifies a load on the diesel engine system when the sensor signal indicates a surge event.

13. The apparatus of claim 12, wherein the electrical transmission comprises:

a generator generating a Direct Current (DC) power signal; and a DC traction motor coupled to an axle wheel set of the locomotive and responsive to the (DC) power signal for rotating the axle wheel set of the locomotive.

14. The apparatus of claim 12, wherein the electrical transmission comprises:

a generator generating a DC power signal;

an inverter for receiving the DC power signal and inverting the received DC power signal into an AC power signal an AC traction motor coupled to an axle wheel set of the locomotive and responsive to the AC power signal for rotating the axle wheel set of the locomotive.

15. An apparatus for detecting operating parameters indicative of a surge event in a turbocharger of a locomotive engine system including a diesel engine and the turbocharger and controlling the operation of the engine system to reduce turbocharger surge, the apparatus comprising:

a sensor detecting an operating parameter of engine system indicative of a surge event and generating a sensor signal indicative of the detected operating parameter; and an engine control system responsive to the sensor signal for controlling a speed of operation of the diesel engine;

wherein when the engine system experiences a surge event, the engine control system increases the speed of the diesel engine to reduce turbocharger surge.

16. The apparatus of claim 15, wherein the engine control system is responsive to the sensor signal to increase the speed of the diesel engine when the sensor signal indicates two surge events within a defined period of time.

17. The apparatus of claim 15, wherein the diesel engine operates at a plurality of discrete operating speeds and the engine control system is responsive to the sensor signal and increases the speed of the diesel engine from a first discrete speed at which the diesel engine is operating to a higher discrete speed when a change in the sensor signal over time indicates a surge event.

18. The apparatus of claim 15, wherein the engine control system increases the speed of the diesel engine an operating speed at which the diesel engine is operating to a higher speed for a predetermined period of time and thereafter decreases the speed of the diesel engine to the operating speed.

19. The apparatus of claim 18, wherein the predetermined period of time is one-hour.

20. The apparatus of claim 18, wherein the engine control system monitors surge events within the predetermined period of time and logs a report or generates a signal when a surge event occurs within the predetermined period of time.

21. The apparatus of claim 15, wherein said throttle has discrete operating positions 1 to 8 and wherein the engine control system increases the engine speed when the sensor signal indicates a surge event and when the throttle is located in one of notch positions 5, 6 or 7.

22. The apparatus of claim 15, wherein the sensor is a manifold air pressure (MAP) transducer associated with an intake manifold of the diesel engine and the sensor signal is a MAP signal representing the air pressure within the intake manifold of the diesel engine, and wherein the engine control system increases the speed of the diesel engine when the MAP signal indicates a decrease in the air pressure of equal to or greater than a predefined amount of pressure within the defined period of time.

23. The apparatus of claim 15, wherein the sensor is a turbocharger speed sensor that detects a rotational speed of the turbocharger and the sensor signal represents the rotational speed of the turbocharger and wherein the engine control system increases the speed of the diesel engine when the sensor signal indicates an increase in the turbocharger speed within a specified period of time.

24. The apparatus of claim 15, wherein the sensor is a pressure transducer associated with an air intake system of the turbocharger and the sensor signal represents an air pressure at the air intake system of the turbocharger, and wherein the engine control system increases the speed of the diesel engine when the sensor signal indicates an increase or decrease in the air pressure over time.

25. The apparatus of claim 15, wherein the sensor is a strain gauge or an accelerometer associated with a surface of an air intake system of the turbocharger and the sensor signal represents a vibration or a deflection, respectively, of the surface of the air intake system, and wherein the control system increases the speed of the diesel engine when the sensor signal indicates an increase in the vibration within a preset period of time indicative of a surge event or indicates a deflection greater than a predetermined amount indicative of a surge event.

26. An apparatus comprising:
  a locomotive driven by a locomotive engine system having a turbocharger and a diesel engine, the engine operable at a plurality of discrete speeds;
  a sensor detecting an operating parameter of the turbocharger and/or the engine and generating a sensor signal representing the detected operating parameter; and
  an engine control system for controlling the speed of the diesel engine at a discrete speed, each of which corresponds to a notch position of a throttle;
  wherein the engine control system is responsive to the sensor signal and increases the speed of the diesel engine from a first discrete speed at which the diesel engine is operating to a higher discrete speed when a change in the sensor signal over time indicates a surge event of the turbocharger.

27. The apparatus of claim 26, wherein the engine control system increases the speed of the diesel engine when the sensor signal indicates two surge events within a defined period of time.

28. The apparatus of claim 26, wherein the diesel engine drives an electrical transmission comprising:
  a generator generating a Direct Current (DC) power signal; and
  a DC traction motor coupled to an axle wheel set of the locomotive and responsive to the (DC) power signal for rotating the axle wheel set of the locomotive.

29. The apparatus of claim 26, wherein the diesel engine drives an electrical transmission comprising:
  a generator generating a DC power signal;
  an inverter for receiving the DC power signal and inverting the received DC power signal into an AC power signal
  an AC traction motor coupled to an axle wheel set of the locomotive and responsive to the AC power signal for rotating the axle wheel set of the locomotive.

30. An apparatus for detecting and responding to a surge event in a turbocharger of a locomotive driven by a diesel engine, the apparatus comprising:
  a sensor detecting an operating parameter of the turbocharger or the engine and generating a sensor signal representing the detected operating parameter; and
  an engine control system for controlling a speed of the diesel engine corresponding to a position of a throttle;
  wherein the engine control system is responsive to the sensor signal and increases the speed of the diesel engine when the sensor signal indicates two surge events within a defined period of time.

31. A locomotive propulsion system comprising a variable-speed diesel engine system having a combustion air intake manifold and an exhaust manifold, a fuel controller for supplying diesel fuel to the engine cylinders, a turbocharger connected to both of the exhaust and intake manifolds of the engine and having a turbine that is driven by the engine exhaust gases and that in turn drives a compressor for supplying pressurized air to the intake manifold, an engine speed sensor for sensing the speed of the engine, an electric power transmission system mechanically driven by the engine, and an excitation controller for controlling the power output of the transmission system; further comprising;
  a sensor equipped to sense an operating parameter of the turbocharger or the engine and equipped to generate a sensor signal representing the sensed operating parameter; and
  a controller adapted to receive the generated sensor signal for increasing the engine speed from a first discrete speed to another discrete speed for a predetermined period of time when a change in the sensor signal over time indicates a surge event.

32. The system of claim 31, wherein the operating parameter includes one or more of the parameters: manifold air pressure (MAP), manifold air temperature (MAT), fuel value, turbocharger speed, vibration parameter, deflection parameter, engine horsepower, wheel slip and mass air flow at the air intake manifold.

* * * * *